(12) United States Patent
Schultz et al.

(10) Patent No.: US 8,042,331 B2
(45) Date of Patent: Oct. 25, 2011

(54) ON-DEMAND HYDRAULIC PUMP FOR A TRANSMISSION AND METHOD OF OPERATION

(75) Inventors: John C. Schultz, Saline, MI (US); Daryl A. Wilton, Macomb, MI (US); Edward W. Mellet, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 873 days.

(21) Appl. No.: 12/060,530

(22) Filed: Apr. 1, 2008

(65) Prior Publication Data

US 2009/0241535 A1 Oct. 1, 2009

(51) Int. Cl.
*F16D 31/02* (2006.01)
(52) U.S. Cl. ............................................. 60/449; 60/486
(58) Field of Classification Search .................... 60/420, 60/422, 484, 486, 489, 449; 417/364
See application file for complete search history.

(56) References Cited

U.S. PATENT DOCUMENTS

| | | | |
|---|---|---|---|
| 3,994,353 A * | 11/1976 | Greene | 180/307 |
| 6,478,549 B1 | 11/2002 | Aden et al. | |
| 6,641,372 B2 | 11/2003 | Davison et al. | |
| 6,669,598 B2 * | 12/2003 | Berger et al. | 477/45 |
| 7,263,978 B2 | 9/2007 | York et al. | |

* cited by examiner

*Primary Examiner* — Michael Leslie
(74) *Attorney, Agent, or Firm* — Quinn Law Group, PLLC

(57) ABSTRACT

A fixed displacement binary pump is provided for a powertrain on a vehicle. A hydraulic system is operatively connected with first and second discharge ports of the pump and is operable to alternately permit fluid flow through both discharge ports (i.e., full displacement or volumetric output of the pump) or permit flow through only the first discharge port (i.e., partial displacement or volumetric output of the pump). The pump may be packaged in a front support of the transmission. An auxiliary pump may be provided that is operable to supplement the output of the binary pump or to be used when the binary pump is off. A method of operating the binary pump and auxiliary pump is provided.

17 Claims, 7 Drawing Sheets

ON-DEMAND HYDRAULIC PUMP FOR A TRANSMISSION AND METHOD OF OPERATION

TECHNICAL FIELD

The invention relates to an on-demand binary fixed displacement hydraulic pump for a hydraulic system of a transmission in a vehicle powertrain and a method of operating the hydraulic system.

BACKGROUND OF THE INVENTION

The hydraulic system for a vehicle transmission serves important lubrication, cooling, and clutch actuation functions necessary for operation of the transmission. Generally, hydraulic pressure and flow within the hydraulic system is provided by an engine-driven hydraulic pump having a rotational speed proportional to engine speed. The hydraulic pump must be designed to meet peak demands, such as hydraulic fluid demand during shifting of the transmission, hot engine idle speed garage shifts, and, in certain transmissions, a hydraulic park mode in an electronic transmission range selector (ETRS) system. Additionally, hydraulic requirements of the transmission may still exist when the engine (and thus the engine-driven pump) is off, such as in an electric-only mode in a hybrid electromechanical powertrain. Pump torque and horsepower requirements rise with increasing pump speed, and have an associated negative effect on fuel economy; thus, it is desirable to limit the flow delivery of the pump, to the extent possible. On-demand pumps, which may include binary pumps, are operable at a full or a partial volumetric output. Thus, such pumps may be operated at a fuel-saving partial output whenever possible, operating at full output only when necessary.

Finally, packaging space may be very limited in certain vehicle designs, driving the location of and potentially the size and type of pumps that may be used. For instance, an "on-axis" hydraulic pump has a rotational axis that is aligned (i.e., coaxial) with an axis of rotation of an input member of the transmission (i.e., the transmission axis). An on-axis pump may extend the overall length of the transmission. An "off-axis" pump has an axis of rotation that is offset from and not concentric or coaxial with the transmission axis. Off-axis pumps offer increased flexibility in packaging location. However, in a rear wheel-drive vehicle, if the transmission "tunnel" running fore and aft in the vehicle (i.e., the packaging space allotted to the transmission, typically tunnel-shaped and under the vehicle floor) has relatively little free packaging space, packaging of an off-axis pump appropriately sized to handle the hydraulic requirements of the transmission may be difficult or impossible.

SUMMARY OF THE INVENTION

To address the challenges of providing a sufficient hydraulic system for a transmission, a fixed displacement binary pump (i.e., a pump which can deliver full or partial volumetric output on demand) is provided for a powertrain on either a front wheel-drive or a rear wheel-drive vehicle (i.e., a vehicle wherein the engine powers the rear wheels through the transmission). A hydraulic system is operatively connected with first and second discharge ports of the pump and is operable to alternately permit fluid flow through both discharge ports (i.e., full displacement or volumetric output of the pump) or permit flow through only the first discharge port (i.e., partial displacement or volumetric output of the pump). A smaller pump displacement (as when the binary pump is operated at partial output) would require less torque and less horsepower to operate the pump, which leads to better fuel economy in the vehicle during steady-state operation. A binary fixed displacement pump can offer the faster response required to enable control of the transitions between partial output during steady-state operation of the transmission and the full output required during transient events such as transmission shifts. This response would be faster than a variable displacement vane pump (VDVP) for example, since it does not require the delay associated with moving a slide as in a VDVP. A further advantage over a VDVP may be improved volumetric efficiency due to reduced internal leakage, enabled by the absence of the moving slide.

The binary pump may be a balanced vane pump with two inlet ports located approximately 180 degrees from one another and two discharge or outlet ports located approximately 180 degrees from each other to balance the effect of fluid force on the pump. Alternatively, the binary pump could be another type of pump, such as two back-to-back to gear pumps, each providing one of the two discharge ports, or a roller vane pump. The hydraulic pump could be either an on-axis pump or an off-axis pump. In one embodiment, the hydraulic pump is a balanced vane pump and is arranged off-axis in a powertrain configured for a rear wheel-drive vehicle. Fluid flow from the separate outlets could be routed to the same component or to separate components in the transmission.

To alleviate packaging limitations, especially in an off-axis rear wheel-drive embodiment, but not limited to such, the fixed displacement hydraulic pump may be configured to be housed within a cavity of a support portion of the transmission housing. The housing defines a first passage extending from the cavity, and the first discharge port of the hydraulic pump is in fluid communication with the first passage. The second discharge port is in fluid communication with the cavity, but not in fluid communication with the first passage when the pump is housed in the cavity. Accordingly, the pump is operable in a binary mode as the discharge ports are routed separately from one another. The transmission housing may further define an inlet passage that is in fluid communication with both the first and second inlet ports of the hydraulic pump. In this arrangement, fluid pressure within the cavity, i.e., resulting from fluid flowing from the second discharge port, fills a portion of the cavity between the housing and the pump and biases the pump into sealing engagement with the housing to decrease internal pump leakage both within the rotating group and with the housing.

Operation of the transmission at engine idle speed often represents the limiting condition which determines the largest required pump displacement, because vehicle maneuvers, such as garage shifts, create significant oil demand from a pump when its capacity is most constrained due to operation at its lowest speed. A hydraulic park feature in a shift by wire application, such as electronic transmission range selection (ETRS), further increases required pump oil demand, increasing required pump displacement. Because a fixed displacement pump produces flow output proportional to rotational speed of the pump, and is typically operated directly at engine speed, sizing the required pump displacement at engine idle speed results in a fuel economy penalty during the remainder of the duty cycle of the vehicle. With a binary pump, the pump can be controlled to provide only a partial output when oil demands are not at peak, resulting in fuel economy savings.

Additionally or alternatively, the total required pump displacement of the hydraulic pump may be downsized by providing an auxiliary pump that is controllable along with the hydraulic pump (which may be referred to herein as the main pump) to address the oil demands of the transmission under the various operating conditions or modes. The auxiliary pump may be driven by mechanical means, such as by a sprocket and chain arrangement driven off of the engine, particularly in a non-hybrid powertrain. Alternatively, the auxiliary pump may be driven by an electric motor in a hybrid transmission, which would allow the auxiliary pump to be driven during electric-only modes in which the engine is off and the engine-driven hydraulic pump is not operable. The auxiliary pump could be a piezoelectric pump, as such may result in reduced power consumption. Preferably, the auxiliary pump is also a fixed displacement pump, like the main pump, as a common control system may be used, potentially resulting in a reduction of necessary components. For example, the same type of pressure regulator valve may be used for both pumps if both are fixed displacement pumps, while a different type of pressure regular valve may be necessary for the auxiliary pump if it is a different type of pump, such as a VDVP. Use of the auxiliary pump in tandem with, i.e., to augment, the main pump is beneficial under certain operating conditions, such as at hot engine idle conditions, when thinner oil viscosity increases any internal leakage in the main pump and results in severe oil demand on the main pump.

As such, a method of operating a hydraulic system for a transmission that is at least partially powered by an engine includes providing an engine-driven binary fixed displacement hydraulic pump having first and second discharge ports. The hydraulic system is configured so that the hydraulic pump is operable at a first volumetric output (e.g., full output) utilizing fluid flowing from both of the discharge ports. The hydraulic pump is also operable at a second volumetric output (i.e., partial output) lower than the first volumetric output and utilizing fluid flowing from only the first discharge port. Under the method, engine speed as well as transmission operating conditions (for example, but not limited to, oil temperature) are monitored and the hydraulic pump is controlled to provide the first volumetric output, while the auxiliary pump provides the third volumetric output when engine speed is less than a predetermined value and predetermined transmission operating conditions are satisfied (e.g., oil temperature is high, such as in a hot engine idle state). The pump is controlled to provide the second volumetric output while the auxiliary pump is controlled to be off when engine speed is greater than or equal to the predetermined value, as the hydraulic pump is sufficiently sized to meet the oil demands of the transmission at higher engine speeds. In a hybrid powertrain, the method includes controlling the auxiliary pump to provide the third volumetric output when the engine is not powering the transmission, i.e., when the engine-driven binary fixed displacement hydraulic pump is inoperable.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
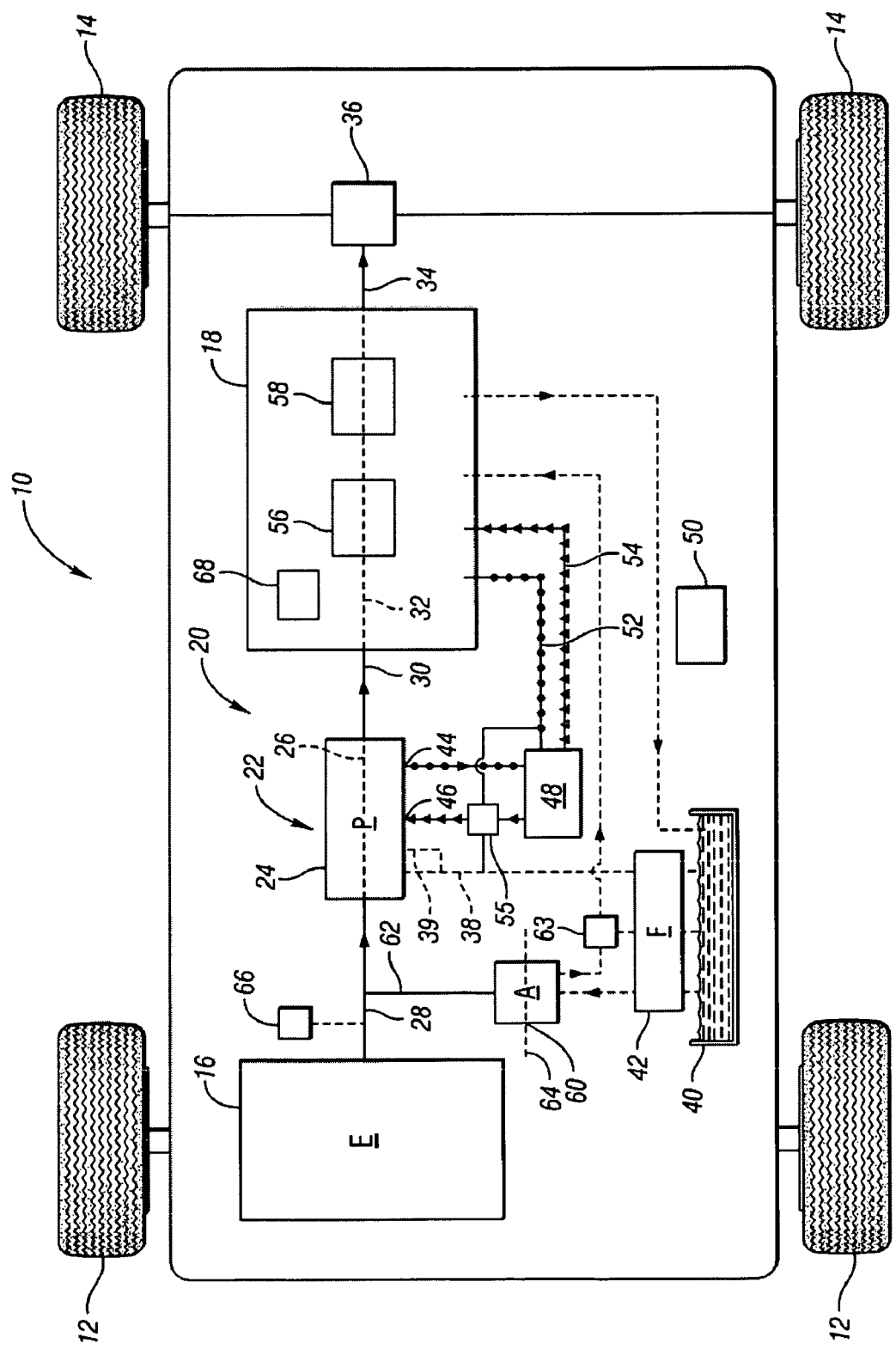
FIG. 1 is a schematic illustration of a rear wheel-drive vehicle with a transmission hydraulic system having an on-axis engine-driven binary pump and an engine-driven off-axis auxiliary pump.

Referring to the drawings, wherein like reference numbers refer to like components, FIG. 1 shows a vehicle 10 having front wheels 12 and rear wheels 14. The rear wheels 14 are powered by an engine 16 via a transmission 18 such that the vehicle 10 is a rear wheel-drive vehicle. While in this embodiment, the transmission is a rear wheel-drive transmission, in other embodiments the transmission may be a front wheel-drive transmission. The engine 16 and transmission 18 are part of a powertrain 20. The powertrain 20 may be non-hybrid (i.e., having the engine 16 as the only source of driving power) or hybrid (i.e., including an additional source of driving power, such as one or more electric motor/generators, a fuel cell, or any other known hybrid power source).

The powertrain 20 further includes a hydraulic system 22 used for providing hydraulic pressure to the transmission 18 for cooling, lubrication, and clutch actuation. The hydraulic system 22 includes an on-axis fixed displacement binary pump 24. The binary pump 24 is "on-axis" because an axis of rotation 26 of the binary pump 24 is aligned coaxially with an axis of rotation of an engine output member 28 and with an axis of rotation of a transmission input member 30, i.e., with a transmission axis of rotation 32. An output member 34 of the transmission 18 powers the rear wheels 14 through a differential 36.

The binary pump 24 is driven by the engine output member 28, preferably via a torque converter pump portion (not shown). The binary pump 24 has a first pump inlet 38 and a second pump inlet 39 that draw fluid from a transmission sump 40 through a filter 42. The binary pump 24 has two separate outlets, including a first discharge port or outlet 44 and a second discharge port or outlet 46. The first discharge port 44 empties to a pressure regulator valve 48 that allows fluid flow from the first discharge port 44 over a main pressure line 52 to the transmission 18. The second discharge port 46 flows through a ball check valve 55 and the pressure regulator valve 48 that selectively, under control of an electronic controller 50 and responsive to relative pressures of fluid flowing from the discharge ports 44, 46, as explained further below, allows fluid flow from the second discharge port 46 over a secondary pressure line 54 to the transmission 18. The first and secondary pressure lines 52, 54 are shown with different shapes in FIG. 1 for purposes of clarity in the illustration (first pressure line 52 with circles and secondary pressure line 54 with triangles). The pressure lines 52, 54 may be in hydraulic communication within the transmission 18 such that a first transmission component 56, such as a torque-transmitting mechanism, i.e., a clutch or brake, is provided with fluid from both of the discharge ports 44, 46. Alternatively, the first and secondary pressure lines 52, 54 may be kept separate from one another, with the secondary pressure line 54 being in fluid communication with a second transmission component 58, such as another clutch or brake, but not with the first component 56.

The hydraulic system 22 also includes an auxiliary pump 60 that is "off-axis" from the transmission axis 32 (i.e., an axis of rotation 64 of the pump 60 is displaced from the transmission axis 32) and is driven by a driving connection 62, such as a chain and sprocket set. The auxiliary pump 60 also draws fluid from the reservoir 40 through the filter 42 and selectively provides fluid at a predetermined volumetric output to the transmission 18 through a switch or solenoid-type valve 63 under the control of the controller 50 to selectively allow fluid to the transmission 18 to augment fluid pressure provided by the binary pump 24, as explained further below. If fluid from the auxiliary pump 60 is not desired under specified transmission operating conditions, then the switch valve 63 redirects the fluid to the sump 40. The electronic and hydraulic connections between the controller 50 and the binary pump 24, the auxiliary pump 60, the pressure regulator valve 48 and other components of the powertrain 20, such as an engine speed sensor 66 and a transmission temperature sensor 68, are not shown for purposes of clarity in the drawings. However, those skilled in the art are familiar with such connections and electro-hydraulic clutch actuations, and will readily understand the ability of the controller 50 to control these components as described below.

Figure 8:
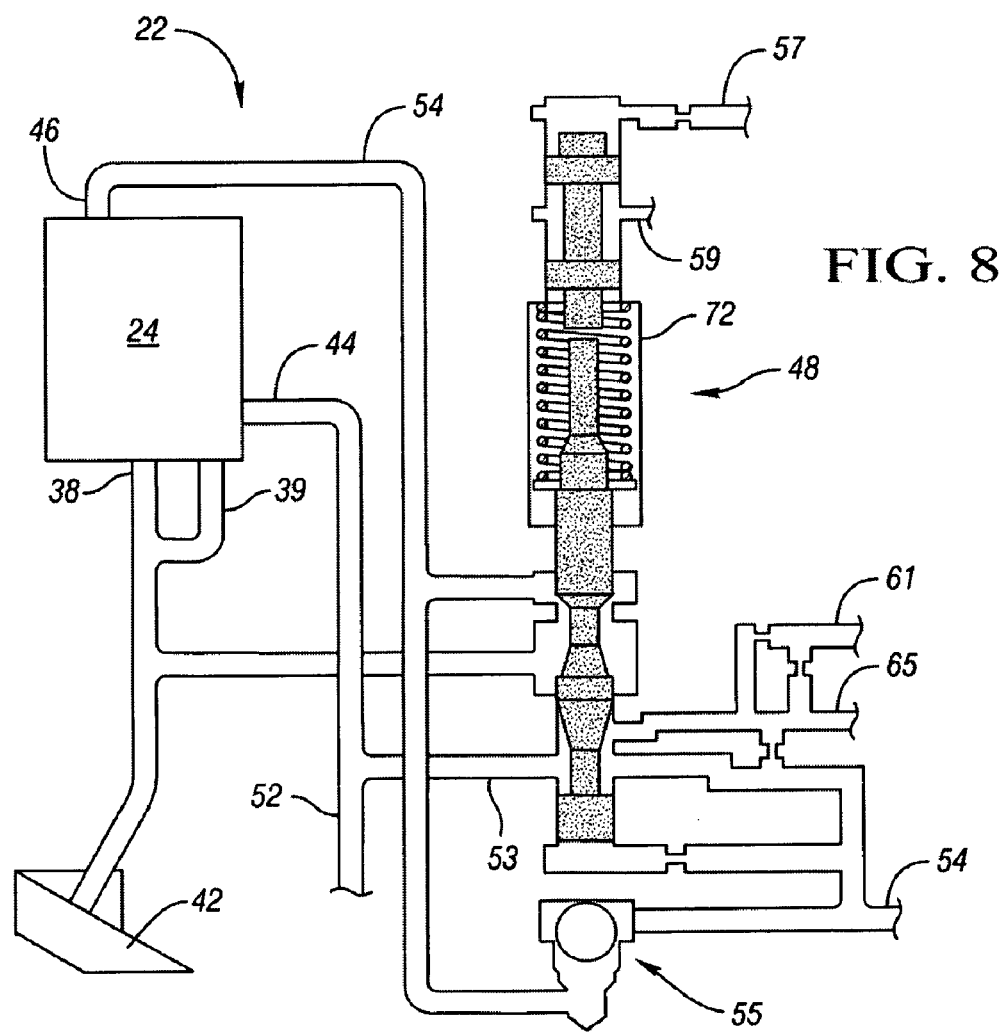
FIG. 8 is a schematic illustration of hydraulic passages and valves include in the hydraulic system of FIGS. 4-7.

The interconnections between the binary pump 24, the pressure regulator valve 48 and the ball check valve 55 are shown in more detail in FIG. 8. In FIG. 8, the two inlets 38, 39 and two outlets 44, 46 are shown extending from the pump 24. Although not shown in the schematic representation of FIG. 8, the inlets 38 and 39 may be positioned 180 degrees opposite one another and the outlets 44, 46 located 180 degrees opposite one another such that the pump 24 is balanced, as best viewed in FIG. 4. Because the pump 24 is engine-driven, when engine speed (in revolutions per minute) increases, the volume of fluid being supplied to the transmission 18 via the hydraulic system 22 also increases. When the output from the binary pump 24 reaches a calibrated maximum, the pressure regulator valve 48 will move far enough against force of a spring 72 to allow feedback pressure of the first pressure line 52 in feedback line 53 to close the ball check valve 55, ceasing fluid flow in secondary line 54, such that the pump 24 is operating at only partial output or displacement. Prior to the calibrated maximum, the ball check valve 55 remains open, and both outlets 44 and 46 provide fluid to the transmission (i.e., at full out or displacement) through pressure lines 52 and 54. A torque signal pressure 57, a reverse port 59, a lube feed 61 and a converter feed 65 also are routed through the pressure regulator valve 48. As is well understood by those skilled in the art, torque signal pressure is a hydraulic signal that increases the line pressure created by the pressure regulator valve 48 as may be required by the transmission 18 to prevent clutches from slipping under conditions of vehicle acceleration with greater torque being transmitted through the driveline. The transmission sump may be too shallow to submerge the pump 24 to keep it primed. Accordingly, another way to keep the pump 24 primed is to seal the pump 24 airtight, which will prevent drain down (i.e., oil draining out of the pump 24) from occurring.

Figure 2:
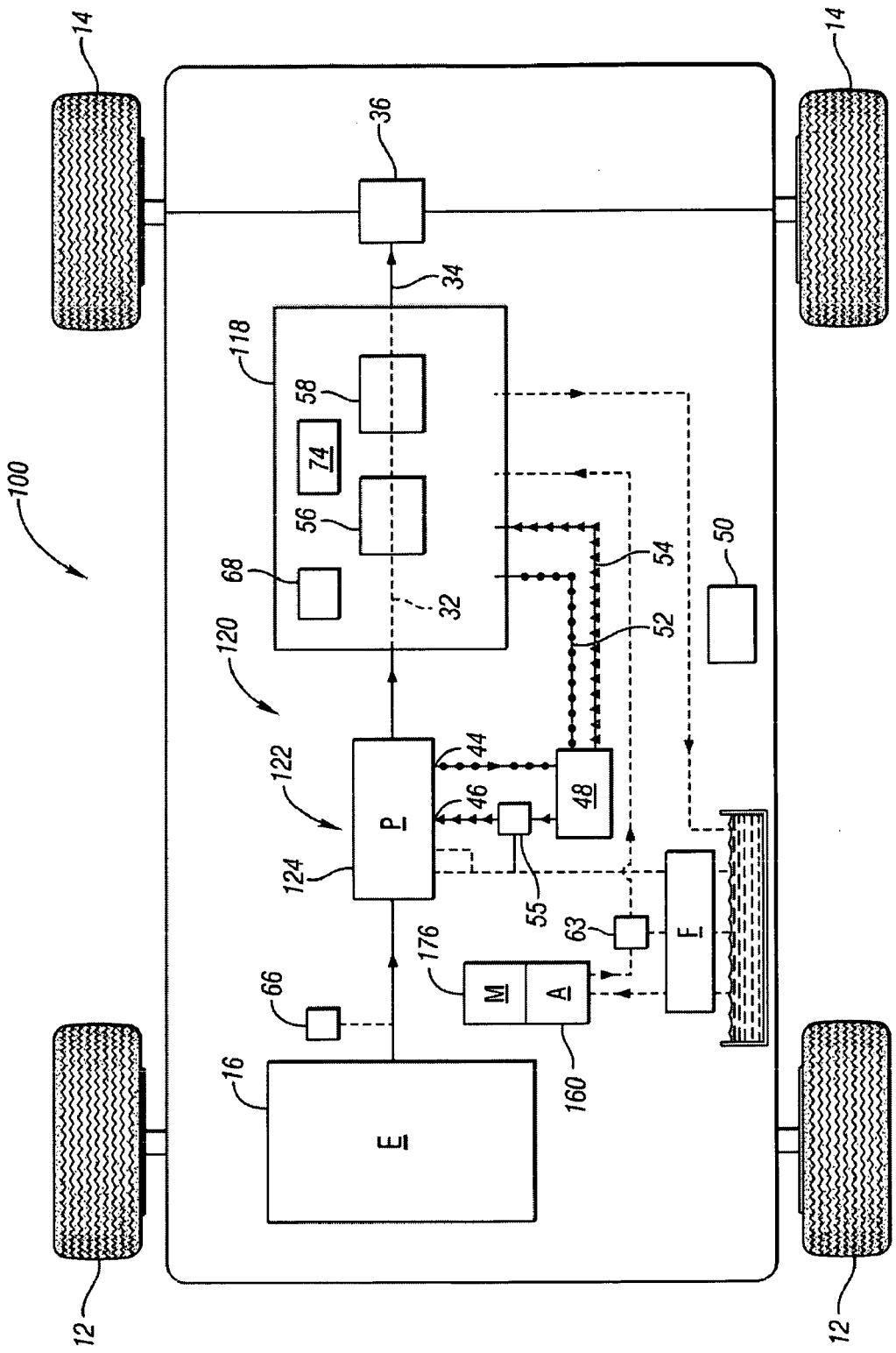
FIG. 2 is a schematic illustration of a rear wheel-drive hybrid vehicle with a transmission hydraulic system having an on-axis engine-driven binary pump and an off-axis auxiliary pump driven by an electric motor.

Referring to FIG. 2, another embodiment of the vehicle 100 includes a powertrain 120 having a hybrid electromechanical transmission 118 connected with the engine 16. Like components functioning in the same manner as described with respect to vehicle 10 in FIG. 1 have like reference numbers in FIG. 2. Because the transmission 118 is a hybrid electromechanical transmission, having electric-only operating modes in which the output member 34 is driven by an electric motor/generator 74, and in which engine 16 is disconnected from and does not drive the output member 34, during such operating modes the engine-driven binary pump 24 is off. Accordingly, an auxiliary pump 160 selectively powered by an electric motor 176 (and not powered by the engine 16) is provided. During electric-only operating modes, auxiliary pump 160 is powered by the electric motor 176 to provide fluid to the transmission 118 at a third volumetric output, in lieu of the partial volumetric output and/or full volumetric output available from the binary pump 24. Additionally, the auxiliary pump 160 may be powered by the electric motor 176 to augment the binary pump 24 even during operating modes when engine 16 is powering the binary pump 24. The additional fluid output available from the auxiliary pump 160 enables the binary pump 24 to be reduced in size, improving fuel economy and increasing packaging options.

Figure 3:
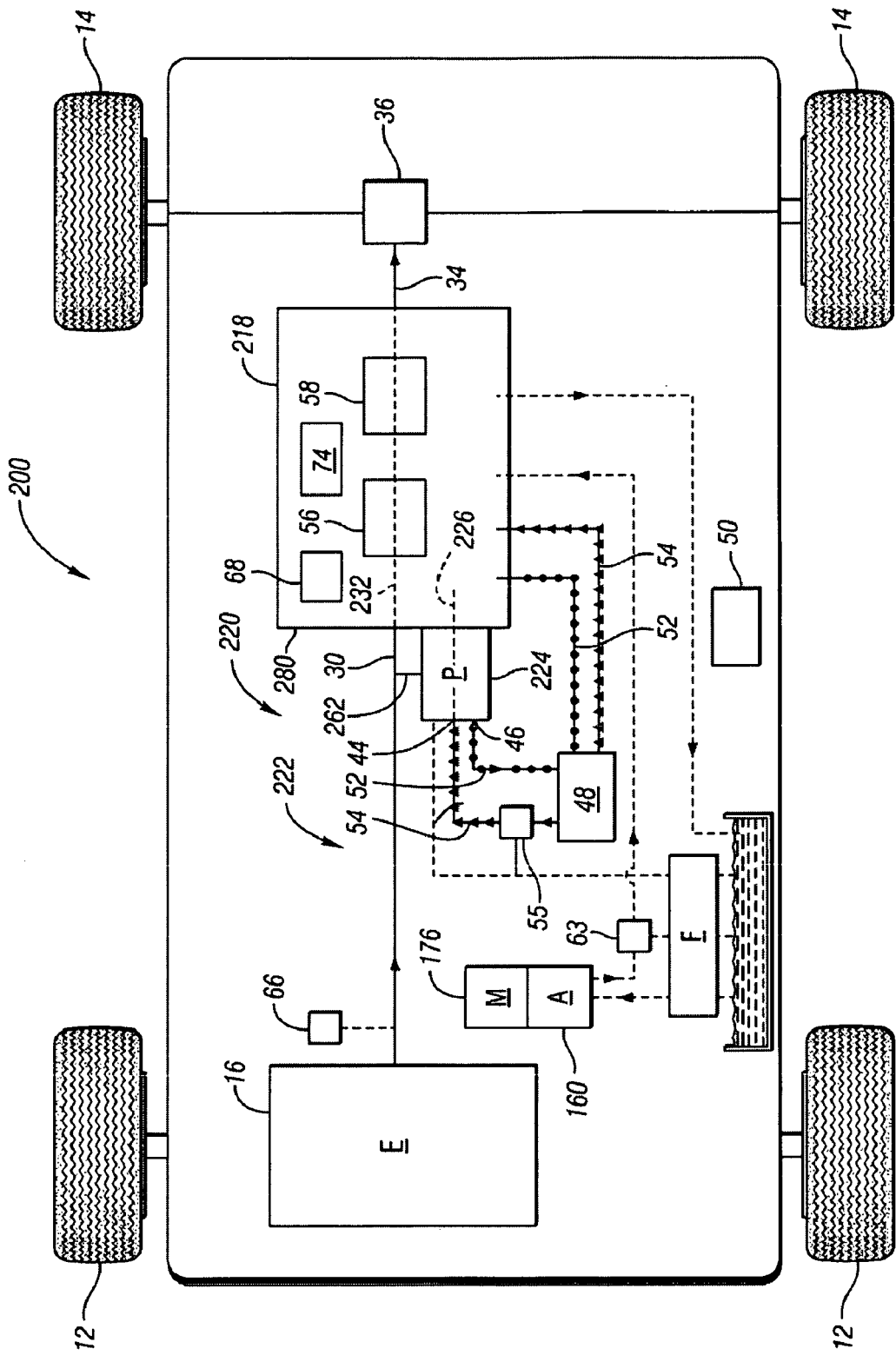
FIG. 3 is a schematic illustration of a rear wheel-drive hybrid vehicle with a transmission hydraulic system having an off-axis engine-driven binary pump supported in a front support portion of the transmission and an off-axis auxiliary pump driven by an electric motor.

Referring to FIG. 3, another embodiment of a vehicle 200 includes powertrain to 220 with a hybrid electromechanical transmission 218 operatively connected to and driven by engine 16. Like components functioning in the same manner as described with respect to vehicle 10 in FIG. 1 and vehicle 100 in FIG. 2 have like reference numbers in FIG. 3. The transmission 218 includes a support portion 280 that supports binary pump 224. The support portion 280 is a front support of the transmission 218, spanning and closing an interior cavity of the transmission 218 substantially transversely, as described with respect to FIG. 6B, in which the support portion 280 is shown in greater detail. Binary pump 224 is an off-axis pump having an axis of rotation 226 that is not coaxial with an axis of rotation 232 of the transmission 218 defined by the transmission input member 30 and transmission output member 34. The binary pump 224 is driven by the engine 16 via a driving connection 262, which may be a chain and sprocket arrangement.

The presence of the electric motor-driven auxiliary pump 160 in the hydraulic systems 122 and 222, respectively, of FIGS. 2 and 3 allows a method of operating the hydraulic system to ensure that the hybrid transmissions 118, 218 are appropriately supplied with fluid pressure. Specifically, the method of operation includes providing the engine-driven binary fixed displacement hydraulic pump 124 or 224 of FIGS. 2 and 3 as described above, along with the auxiliary pump 160. The method further includes monitoring engine speed via the engine speed sensor 66 and relaying engine speed information to the controller 50. Transmission operating conditions are also monitored and relayed to the controller 50, such as by monitoring the transmission temperature via the transmission temperature sensor 68. The engine-driven binary fixed displacement hydraulic pump 124 or 224 is then controlled to provide the appropriate volumetric output in accordance with the monitored engine speed and transmission operating conditions. Specifically, the pump 124 or 224 is controlled to provide a first volumetric output that utilizes fluid flow from both pump discharge ports 44, 46 (i.e., full output) when engine speed is less than a predetermined value and predetermined transmission operating conditions are satisfied (e.g., the transmission 118 or 218 is at or above a predetermined minimum temperature). The auxiliary pump 160 is also controlled to provide a third volumetric output under these conditions. Thus, at low engine speed with relatively high transmission temperature, such as a hot engine idle condition, when the maximum amount of pump output is required for operating the transmission, both the pump 124 or 224 and the auxiliary pump 160 provide a maximum amount of fluid output to the transmission 118 or 218. At higher engine speeds, when the engine-driven binary pump 124 or 224 therefore provides a greater volumetric output proportional to the engine speed, fluid flow at partial output from binary pump 124 or 224 is satisfactory for satisfying the transmission operating conditions. Accordingly, the electric motor 176 for the auxiliary pump 160 is turned off, and the hydraulic system 122 or 222 is controlled to operate the binary pump 124 or 224 at partial output. Furthermore, when the engine 16 is not powering the transmission 118 or 218, such as in an electric-only operating mode, the auxiliary pump 160 is powered by the motor 176 to provide the third volumetric output to the transmission 118 or 218.

Figure 4:
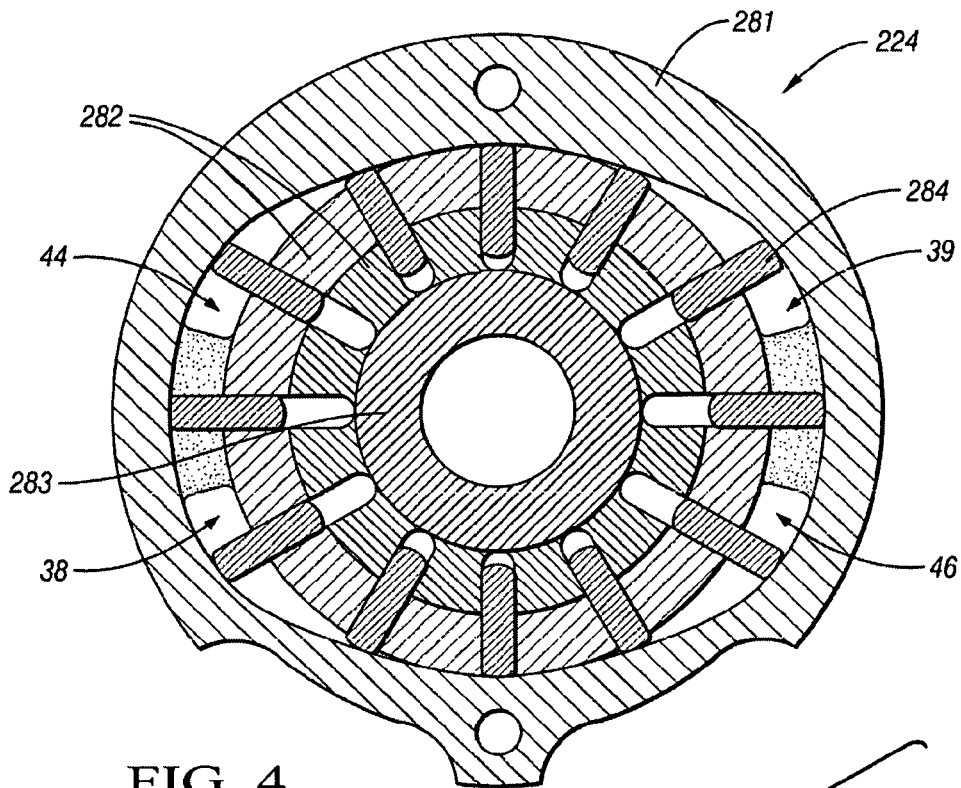
FIG. 4 is a schematic cross-sectional illustration of a portion of a balanced vane binary pump that may be used as the pump of FIG. 3.
Figure 5:
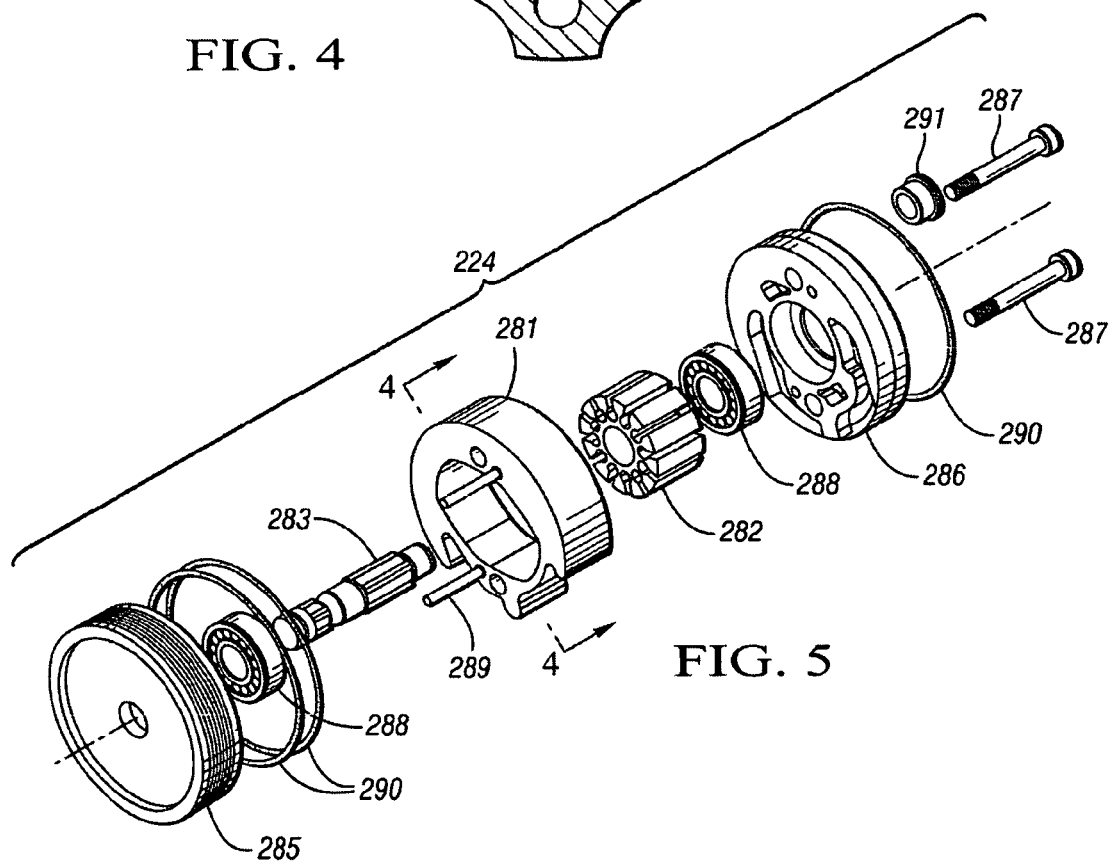
FIG. 5 is a schematic perspective illustration in exploded view of the balanced vane pump of FIG. 4.
Figure 6B:
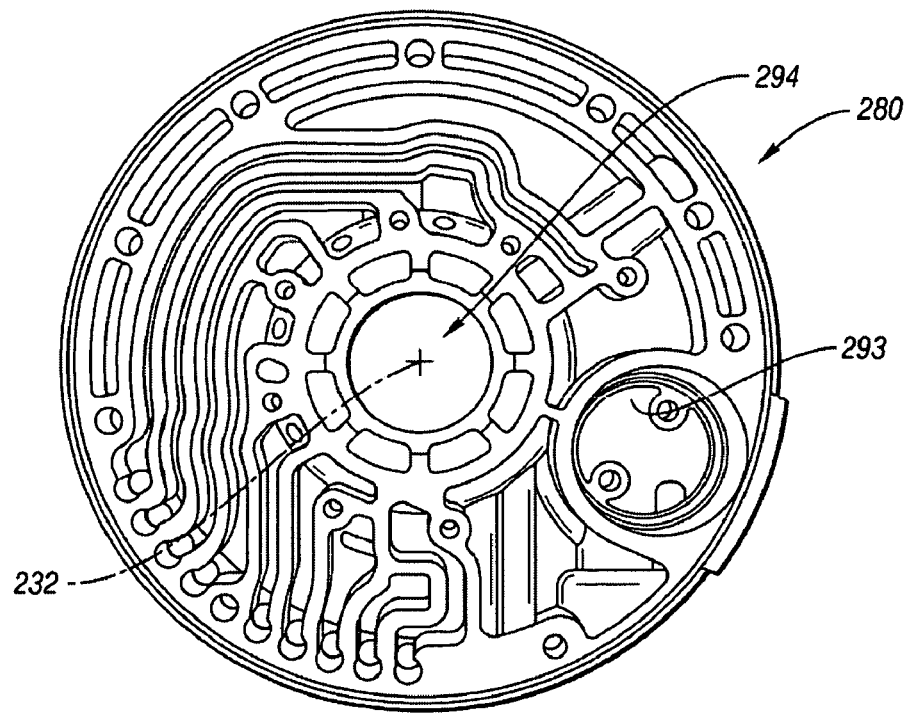
FIG. 6B is a schematic front view illustration of the front support of FIGS. 3 and 6A.
Figure 7:
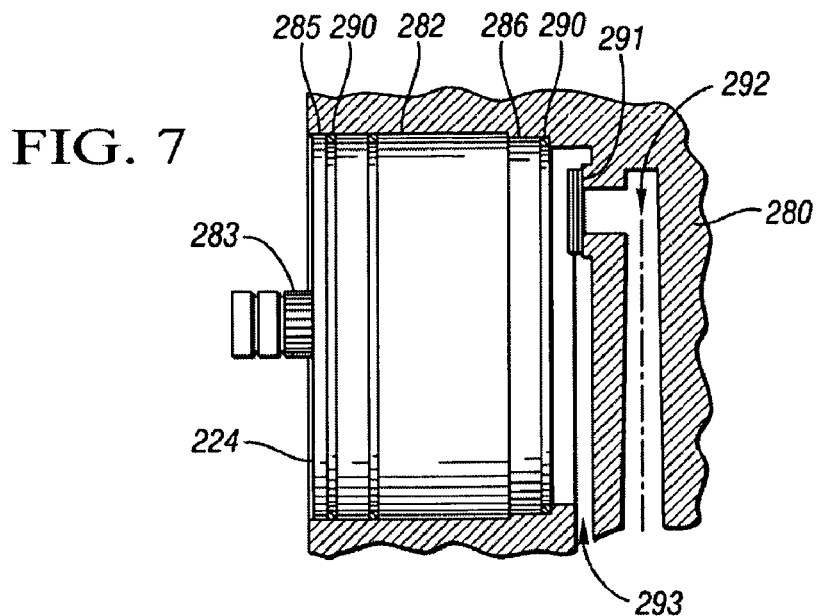
FIG. 7 is a schematic side view illustration of the balanced vane pump of FIG. 5 supported in the front support of FIGS. 6A-6B.

FIG. 4 is a cross-sectional view of the balanced vane binary pump 224 of FIG. 3. A balanced vane binary pump 224 is also shown in exploded view in FIG. 5. FIG. 4 is taken at the lines 4-4 of FIG. 5. Referring to FIGS. 4 and 5, pump 224 includes a mid plate 281 forming any elongated cavity in which a rotor 282 rotates in response to the rotation of an engine driven shaft 283. The rotor 282 has slots which carry pump vanes 284 (vanes not shown in FIG. 5). A front plate 285 and a pressure plate 286 are retained on either side of the mid plate 281 by screws 287. The front plate 285, pressure plate 286, and mid plate 281 cooperatively form the first and the second inlet port 38, 39, respectively, located approximately 180 degrees from one another. The front plate 285, pressure plate 286, and mid plate 281 also cooperatively form discharge ports 44 and 46 located approximately 180 degrees from one another. Ball bearings 288 help reduce friction of the rotating rotor 282. Dowels 289 help maintain the front plate 285, pressure plate 286, and mid plate 281 to one another prior to retaining with the screws 287. Sealing O-rings 290 helps sealingly engage the binary pump 224 with the front support portion 280, as further described with respect to FIG. 7. Additionally, an outlet seal 291 sealingly connects the first discharge port 44 with a first passage 292 formed in the support portion 280, as best viewed in FIG. 7. The passage 292 is in fluid communication with the first pressure line 52 of FIG. 3. The second discharge port 46 empties to a cavity 293 formed between the front support 280 and the binary pump 224 when the binary pump 224 is packaged in a cavity or pocket 293 of the support portion 280, best shown in FIG. 6B. Referring to FIG. 6B, a torque converter (not shown) or other engine-driven member extends through a central opening 294 in the front support portion 280. Binary pump 224 is driven by a sprocket and chain arrangement or other driving connection 262, as shown in FIG. 3, when offset from the axis of rotation 232 of the transmission and supported in cavity 293 (driving connection 262 not shown in FIG. 3).

Figure 6A:
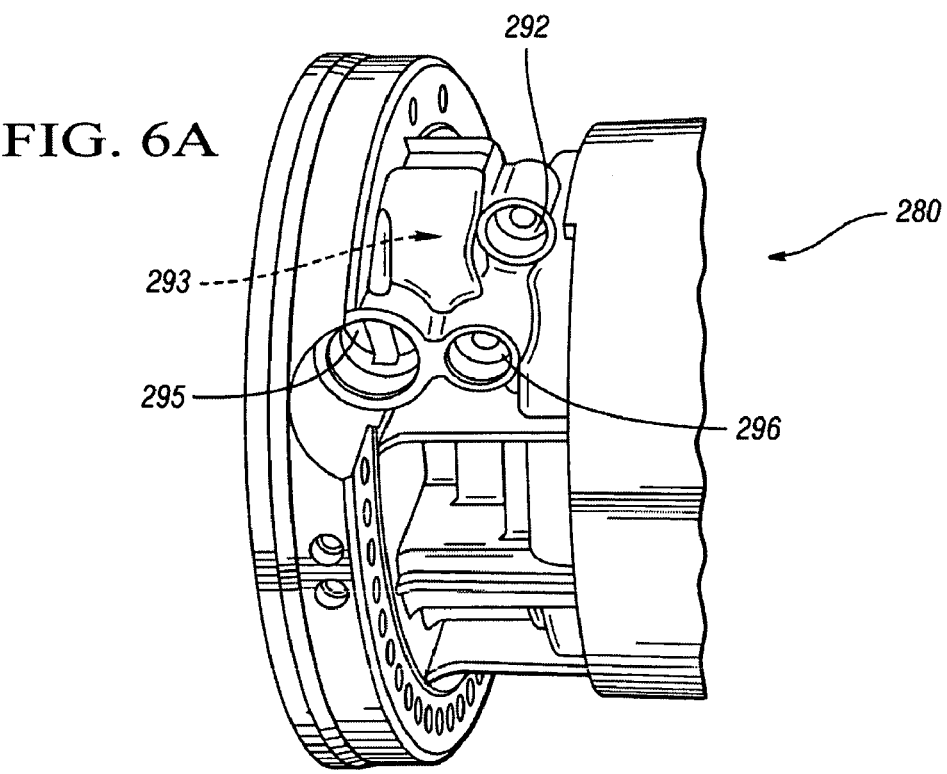
FIG. 6A is a schematic perspective illustration of the front support of FIG. 3.

Referring to FIG. 6A, the front support portion 280 is formed within inlet 295 in fluid communication with the first and second inlets 38 and 39 of FIG. 4 when the binary pump 224 is packaged in the cavity 293. Additionally, the front support portion 280 forms the first discharge passage 292, as well as second discharge passage 296 that is in fluid communication with the cavity 293 shown in FIG. 7, and with the second discharge port 46, and with the secondary line 54. Fluid pressure exiting the second discharge port 46 and filling a portion of cavity 293 between the front support 280 and the pump 224 biases the pump 224 to decrease internal pump leakage both within the rotating group between the mid plate 281, front plate 285, and pressure plate 286 and against the O-ring seals 290 to help retain the pump 224 in sealing engagement with the front support portion 280.

The hydraulic systems 122 and 222 of FIGS. 2 and 3 operate in like manner as the hydraulic system 22 described with respect to the transmission 20 of FIG. 1 and with respect to FIG. 8.

Figure 9:
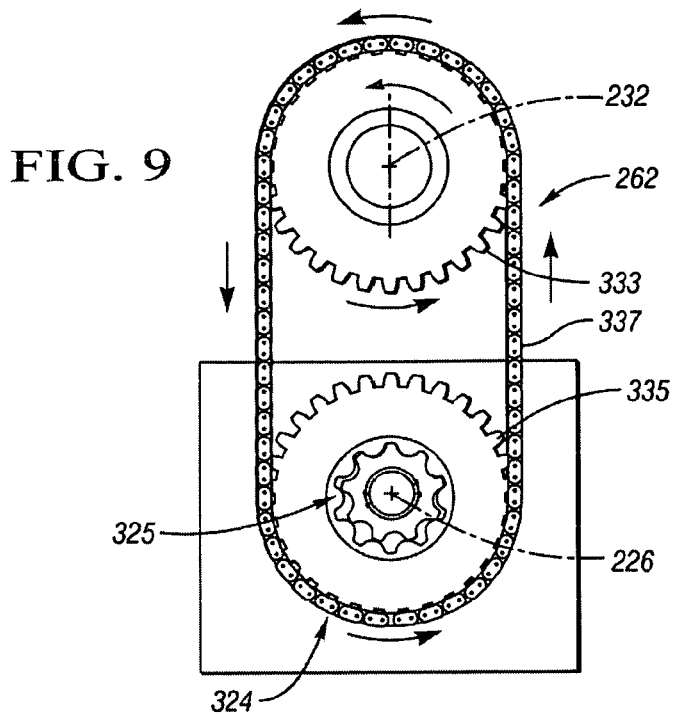
FIG. 9 is a schematic side view illustration in partial cross-sectional view of an off-axis binary gear pump that may be used as the pump of FIG. 3.
Figure 10:
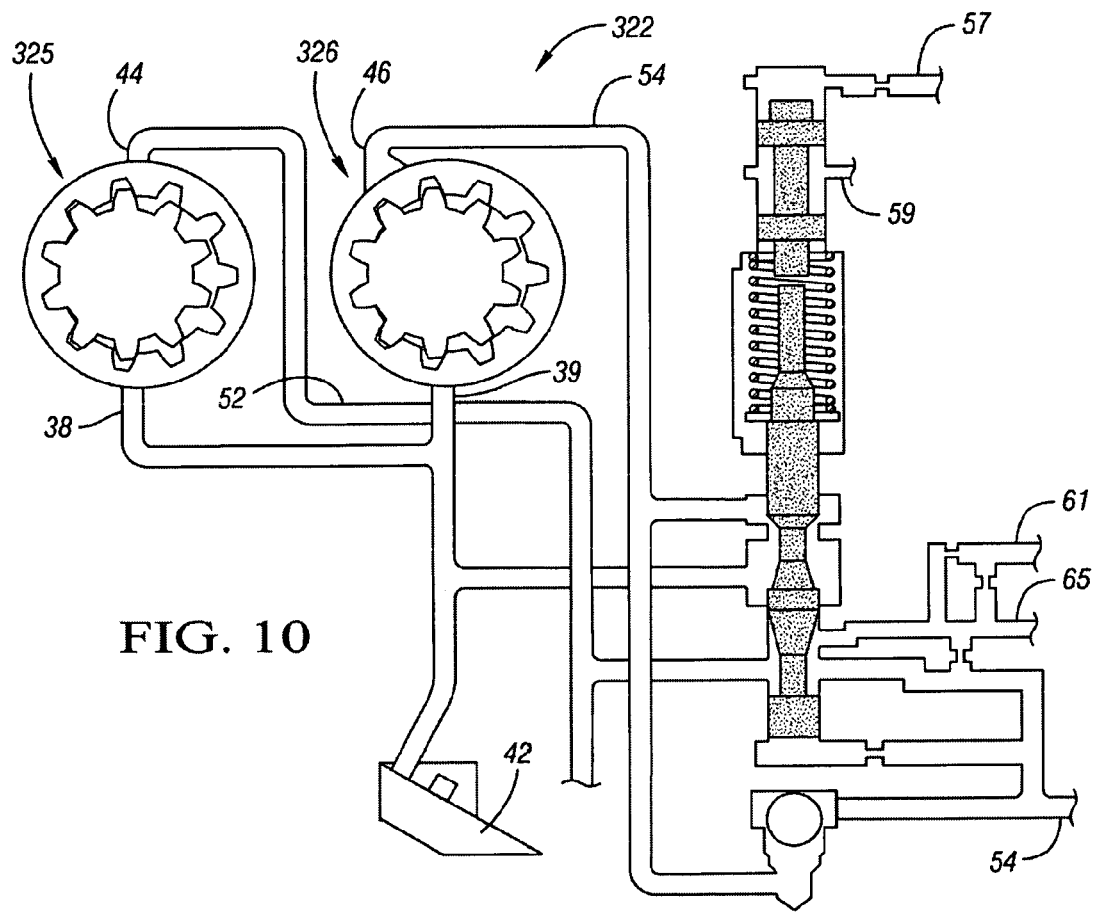
FIG. 10 is a schematic illustration of hydraulic passages and valves included in the hydraulic system of FIGS. 3 and 9.

Referring to FIG. 9, an alternative embodiment of a binary pump 324 is illustrated. The binary pump 324 includes first and second gear pumps, positioned back-to-back with one another such that only a first gear pump 325 is visible in FIG. 9. The binary gear pump 324 may be used in an off-axis or an on-axis arrangement. In FIGS. 9 and 10, the binary pump, including the first gear pump 325 and the second gear pump 326, are used in an off-axis arrangement. The first gear pump 325 as well as a second gear pump 326 are visible in FIG. 10, but are not shown in the back-to-back arrangement in FIG. 10 for clarity in illustrating the hydraulic system 322. Binary gear pump 324 is engine-driven and is off-axis from a transmission centerline 232 of FIG. 3 and may be used in place of binary pump 224 of FIG. 3. The driving connection 262 includes sprockets 333 and 335, as well as chain 337. Alternatively, the binary pump 324 could be used in an on-axis arrangement, such as in place of binary pump 24 of FIG. 1.

Referring to FIG. 10, first discharge port 44 extends from the first gear pump 325 to the pressure line 52. Discharge port 46 extends from the second gear pump 326 to the secondary pressure line 54. Hydraulic system 322 of FIG. 10 operates in like manner as hydraulic system 22 described with respect to FIGS. 1 and 8, with like reference numbers referring to like components.

While the best modes for carrying out the invention have been described in detail, those familiar with the art to which this invention relates will recognize various alternative designs and embodiments for practicing the invention within the scope of the appended claims.

The invention claimed is:
1. A powertrain for a vehicle having wheels, comprising:
an engine;
a transmission having an input member for receiving power from the engine and an output member for delivering power to the wheels;
a fixed displacement hydraulic pump driven by the engine and having a first and a second discharge port;
a hydraulic system operatively connected with the discharge ports and operable to permit fluid flow through both discharge ports to provide a first volumetric output when engine speed is less than a predetermined value and to permit fluid flow through only the first discharge port to provide a second volumetric output less than the first volumetric output when engine speed is greater than or equal to the predetermined value.

2. The powertrain of claim 1, wherein the transmission has a first component operatively connected with the hydraulic pump; and wherein the hydraulic system is configured such that fluid flow permitted through both of the respective discharge ports is routed to the first component.

3. The powertrain of claim 1, wherein the transmission has a first and a second component operatively connected with the hydraulic pump; and wherein the hydraulic system is configured such that fluid flow permitted through the first discharge port is routed to the first component and fluid flow permitted through the second discharge port is routed to the second component.

4. The powertrain of claim 1, wherein the hydraulic pump is a balanced vane pump.

5. The powertrain of claim 1, wherein the transmission input member defines an input axis, and further comprising:
an auxiliary pump defining an axis of rotation; wherein the axis of rotation of the auxiliary pump is not coaxial with the input axis.

6. The powertrain of claim 5, wherein the auxiliary pump is operatively connected with and driven by the engine.

7. The powertrain of claim 5, further comprising an electric motor; and
wherein the auxiliary pump is driven by the electric motor.

8. The powertrain of claim 1, wherein the transmission includes a housing with a support portion; wherein the support portion defines a cavity configured to house the hydraulic pump.

9. The powertrain of claim 8, wherein the housing further defines a first passage in fluid communication with the first discharge port; and wherein the second discharge port is in fluid communication with the cavity when the hydraulic pump is housed in the cavity.

10. The powertrain of claim 1, wherein the transmission input member defines an input axis; and wherein the hydraulic pump defines an axis of rotation coaxial with the input axis.

11. The powertrain of claim 1, wherein the wheels include front wheels and rear wheels, and wherein the transmission delivers power to the rear wheels.

12. A hydraulic system for a transmission comprising:
a transmission housing having a support portion defining a cavity and further defining a first passage extending from the cavity;
a fixed displacement hydraulic pump configured to be housed within the cavity and having a first discharge port and a second discharge port; wherein the first discharge port is in fluid communication with the first passage and the second discharge port is in fluid communication with the cavity and is not in fluid communication with the first passage when the pump is housed in the cavity such that the pump is operable in a binary mode.

13. The hydraulic system of claim 12, wherein the hydraulic pump has a first inlet port and a second inlet port; and wherein the transmission housing further defines an inlet passage in fluid communication with both the first and second inlet ports.

14. The hydraulic system of claim 13, wherein the hydraulic pump is a balanced vane pump; and wherein fluid pressure within the cavity biases the pump in sealing engagement with the housing.

15. The hydraulic system of claim 12, wherein the transmission has a transmission input member defining an input axis; and wherein the hydraulic pump defines an axis of rotation coaxial with the input axis.

16. A method of operating a hydraulic system for a transmission at least partially powered by an engine, comprising:
providing an engine-driven binary fixed displacement hydraulic pump having first and second discharge ports; wherein the hydraulic system is configured such that the hydraulic pump is operable at a first volumetric output utilizing fluid flowing from both of the discharge ports; and wherein the hydraulic pump is operable at a second volumetric output lower than the first volumetric output and utilizing fluid flowing from only the first discharge port;
providing an auxiliary pump not driven by the engine and configured to provide a third volumetric output;
monitoring engine speed and at least one predetermined transmission operating condition;
controlling the engine-driven binary fixed displacement pump to provide the first volumetric output and controlling the auxiliary pump to provide the third volumetric output when engine speed is less than a predetermined value and the at least one predetermined transmission operating condition is satisfied; and
controlling the engine-driven binary fixed displacement pump to provide the second volumetric output and controlling the auxiliary pump to be off when engine speed is greater than or equal to the predetermined value.

17. The method of claim 16, further comprising:
controlling the auxiliary pump to provide the third volumetric output when the engine is not powering the transmission.

* * * * *